Figure 1:
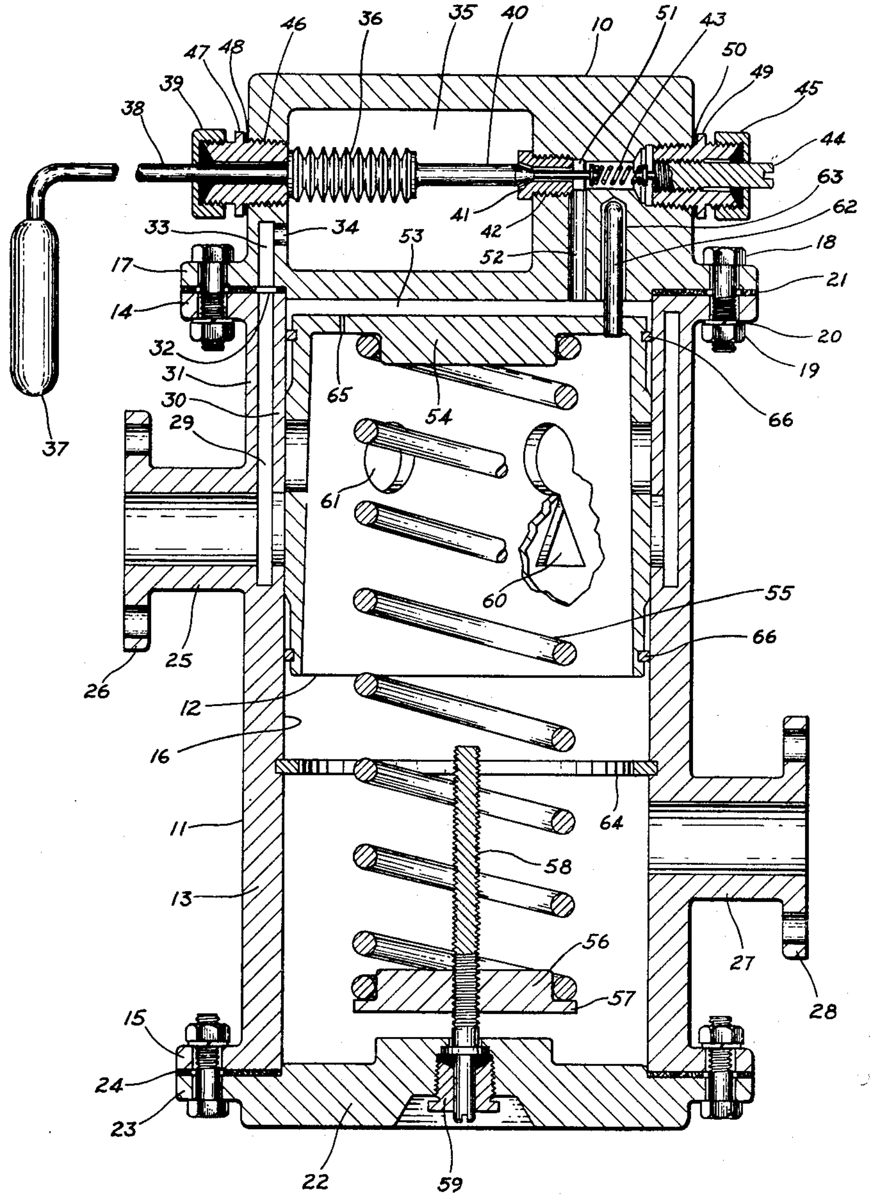

Aug. 25, 1964 B. H. PROUTY 3,145,927

STEAM TRAP

Filed June 18, 1962

INVENTOR.
BERNARD H. PROUTY
BY Moore, White & Burd
ATTORNEYS

United States Patent Office 3,145,927
Patented Aug. 25, 1964

3,145,927
STEAM TRAP

Bernard H. Prouty, 2211 Colfax Ave. S., Minneapolis, Minn.

Filed June 18, 1962, Ser. No. 203,221
12 Claims. (Cl. 236—54)

This invention relates to a steam trap and more particularly to a temperature regulated thermostatic steam trap useful in a high pressure steam system.

The invention is shown in the single figure of drawings which is an elevation, in section, of the steam trap according to the present invention.

Referring now to the drawing, the steam trap according to the present invention consists of three essential parts; namely: a thermal head, indicated generally at 10; a cylinder body, indicated generally at 11; and a piston, indicated generally at 12. The cylinder body 11 includes a generally cylindrical tubular housing 13 having a top flange 14 and a bottom flange 15. The inner bore 16 of the cylinder body is machined to receive the piston 12. The thermal head 10 is provided with a mating flange 17 and is secured to the top of the cylinder body to flange 14 by fastening means, such as bolts 18, nuts 19, and lock washers 20, or equivalent fastening means. A ring gasket 21 is interposed between the flanges 14 and 17 to insure a pressure tight connection between the thermal head and cylinder body.

The cylinder body 11 is fitted with a bottom base plate 22 whose flange 23 mates with bottom flange 15 of the cylinder body. The bottom base plate is secured to the body by suitable fastening means or, in some instances, may be cast as an integral part of the body. A ring gasket 24 insures a pressure tight seal. The cylinder body is provided with an inlet fitting 25 whose flange 26 facilitates connection of the steam trap into a steam system. The body is also provided with a discharge fitting 27 whose flange 28 facilitates connection to a suitable pipe or conduit or discharge condensate and exhaust steam.

Inlet 25 communicates directly with an annular chamber 29 in the upper part of cylindrical housing 13 extending around the cylinder body between an inner wall 30 and an outer wall 31. Chamber 29 communicates directly through a port 32 in gasket 21 with a channel 33 in the thermal head 10. Channel 33 in turn communicates through one or more thermal head ports 34 with chamber 35 of the thermal head. Positioned within chamber 35 in the thermal head 10 is a heat sensing bellows 36. The bellows is attached to a thermal bulb 37 by means of a capillary tube 38 passing through a packing gland 39 to the thermal head chamber. Thermal bulb 37 is filled with a heat expandable fluid. It is located in the steam system upstream from the steam trap. Expansion of the fluid in thermal bulb 37 causes expansion of bellows 36.

One end of bellows 36 is fixed. The other end is movable and has attached to it a pilot needle valve 40 adapted to seat in a needle valve seat fitting 41 in a discharge port 42 from the chamber 35. The pilot valve 40 is spring loaded by means of coil spring 43 in such manner as to normally maintain pressure on bellows 36 to maintain the pilot valve open. Tension on coil spring 43 is adjusted by means of a screw 44 fitted into the thermal head through a packing gland 45. The spring adjusting means functions as a fine adjustment on the bellows and thus acts as a fine temperature control.

The bellows 36, pilot valve 40, and valve seat 41 are all adapted to be inserted and removed through an opening 46 in the thermal head wall which is provided with a fitting 47, gasketed at 48 to maintain a pressure tight seal. Similarly, adjusting screw 44 is supported in a fitting 49 in the wall of the thermal head, which is gasketed at 50 to maintain a pressure tight seal. Pilot valve 40 controls flow to a channel 51 and an actuating outlet port 52 from the thermal head which communicates with the space 53 at the head of the cylinder above piston 12.

Piston 12 is hollow and cylindrical to move with a tight slide fit in the bore 16 of the cylinder housing. It is closed at one end and open at the other. The inside of the closed end of the piston is provided with a boss 54 to engage one end of a heavy coil spring 55 by which the piston is spring loaded. The opposite end of coil spring 55 engages a boss 56 on a threaded adjusting plate 57 which is carried on an adjusting screw 58 centrally disposed in the bottom of the cylinder. Adjusting screw 58 is mounted in the base plate 22, extending through a packing gland 59 to maintain a pressure tight seal. Spring 55 is under compression and may be adjusted by rotation of the adjusting screw.

The inside wall 30 of the annular chamber 29 surrounding the upper part of the cylinder is provided with a plurality of apertures or ports 60 evenly spaced in a ring about the cylinder wall so as to equalize pressure or thrust on the side of the piston. Piston 12 is provided with a corresponding number of matching and longitudinally aligned ports or apertures 61 evenly spaced in a ring extending around the wall of piston 12. The apertures or ports 60 in the cylinder wall preferably have the shape generally of equilateral triangles positioned with their bases generally parallel to the base plate of the cylinder housing. Ports 60 communicate with the annular chamber 29. The ports 61 in the piston wall are generally circular. The vertical distance from the base to the vertex of the triangular cylinder wall ports 60 is preferably equal to the diameter of the circular ports 61 in the piston.

Cylinder ports 60 and piston ports 61 are equal in number and are aligned vertically, or longitudinally, with one another. The ports are so disposed longitudinally that, when piston 12 is in its uppermost position in the top of the cylinder, the vertex of each triangular cylinder port 60 is located so as to fall just short of meeting the circumference of the matching circular port 61. Thus, when piston 12 is in its uppermost position, ports 60 and 61 do not overlap, the valve is closed, and no flow through ports 60 and 61 is possible. However, when piston 12 is forced downwardly in the cylinder against the pressure of spring 55, ports 60 and 61 do overlap and discharge ports of increasing cross-sectional area are exposed.

As the piston is initially forced downwardly, only the apex of each triangular port 60 is exposed through circular piston ports 61. Because of the presence of the matching triangular and circular ports, the rate of flow of discharge through the ports increases faster than the rate of movement of the piston. Thus, the flow of condensate at full piston travel is four times that at one-half piston travel.

In order to insure matching of the cylinder and piston ports, an aligning pin 62 is provided in the top of piston 12 for vertical movement in a channel 63 in the thermal head casting. Thus, while the piston may be moved vertically, it cannot be rotated. The top of pin 62 bottoming in channel 63 determines the uppermost position of piston 12 in its stroke.

Stop means for the piston are provided in the bottom portion of the cylinder wall, such as an expansion ring 64 set in the cylinder wall, or any equivalent stop means to engage the bottom of the piston to limit its stroke. The stroke of the piston 12 is limited to the distance represented by the diameter of the ports 61 and the distance between the apex and base of the triangular ports 60.

A bleed-off orifice 65 is provided in the top of piston 12 to permit the release of pressure from the top of the piston when the pilot valve in the thermal head closes so as to permit coil spring 55 to return the piston to its uppermost position. The orifice also functions to stabilize the piston movement by controlling to some extent the rate of movement of the piston. One or more piston rings 66 at the top and at the bottom of the piston aid in insuring against accidental discharge flow around the piston wall.

In use, the steam trap according to the present invention is installed in a steam system. Under actual operating conditions, condensate and steam enter through the inlet 25 and fill the annular chamber 29 around the top of the cylinder. A portion of the condensate and steam passes through the gasket port 32 and channel 33 to the thermal head port 34, and thence to the chamber 35 in the thermal head 10 containing the heat sensitive bellows 36. The temperature setting on the bellows is predetermined and is set by means of adjusting screw 44. Pressure through the expansion of the fluid in the bulb is transmitted to the bellows from thermal bulb 37 through capillary 38 to expand the bellows and close pilot valve 40 at the predetermined temperature.

If the temperature of the condensate and steam in the chamber surrounding the bellows is equal to or higher than the temperature setting on the bellows, then the action of the bellows holds the pilot valve 40 in the valve seat 41 against the pressure of coil spring 43 to close the pilot port and prevent any outflow from the thermal head. In this condition, piston 12 is maintained at its uppermost position by virtue of coil spring 55.

If the temperature of the condensate and steam is lower than the temperature setting on the bellows then the condensate and steam cools the bellows causing it to retract and pilot valve 40 remains in its normal open position assisted by coil spring 43. Condensate and steam can then pass through the pilot valve into channel 51 and actuating port 52 to the head space 53 at the top of the spring loaded piston 12.

Because of the pressure difference across the orifice 65 in the top of the piston, some condensate and steam will escape through this orifice. Since the cross sectional area of the actuating port 52 is substantially greater than the cross sectional area of the orifice, a pressure build-up occurs in the head space above the piston. As this force builds up on the top of the piston, the compression of coil spring 55 pushing the piston upwardly is overcome and the piston is moved downwardly.

As the piston moves down, it immediately starts to open the triangular ports in the cylinder wall by means of the circular ports 61 in the piston wall. Condensate and steam thus flows through the ports 60–61 from the annular chamber 29 into the body of the cylinder at a rate dependent upon how far the piston moves downward.

The thermal bulb 37 connected to the heat sensitive bellows 36 is located in the inlet line to the trap spaced a convenient distance upstream from the trap. As the temperature of the condensate and steam rises in the inlet line to the trap, the fluid in the thermal bulb expands and causes pressure to build up. This pressure, which is transmitted through the capillary tube 38 to the bellows, causes the bellows to expand thus forcing the pilot valve 40 to move toward its seat 41. Closing of the pilot valve results in less condensate and steam flowing to the top of the piston, thereby reducing the pressure on the top of the piston. This causes the piston to move upwardly under spring pressure, thereby reducing the rate of discharge flow through the trap.

As the rate of flow through the trap becomes smaller, the condensate and steam have to give up more of its heat before discharge. As the condensate and steam in the inlet upstream from the trap cools to a temperature below the setting or adjustment on the bellows and pilot valve, the fluid in the thermal bulb contracts. This decreases the pressure transmitted to the bellows. The decreased pressure on the bellows plus the compression of the adjustment coil spring 43 on the pilot valve causes the bellows to contract and open the pilot valve. This once again permits condensate and steam to bleed off through the trap until the temperature of the condensate and steam again rises. The cycle is thus repeated as required to maintain the desired condition in the system.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A temperature regulated thermostatic steam trap comprising a cylinder body, a piston movable in said cylinder body and a thermal head regulating movement of the piston; said body including an inlet and a discharge outlet, an annular chamber in communication with said inlet and surrounding the bore of the cylinder body receiving said piston, and a plurality of ports from said chamber to the interior of the cylinder body, said ports being normally closed by said piston; said thermal head including a chamber, an inlet port to said chamber in communication with said annular chamber in said cylinder body and an outlet port from said chamber to the cylinder head space above said piston, and a temperature sensitive pilot valve between said chamber and outlet port; said piston being generally tubular and closed at one end and open at the other, a bleeder orifice in the closed end of said piston, a plurality of ports in the wall of said piston, said ports matching in number and longitudinal alignment the ports in the cylinder wall, means to normally maintain the ports of said piston out of communication with said cylinder wall ports, but said piston being movable longitudinally to bring said ports into direct communication.

2. A steam trap according to claim 1 further characterized in that said temperature sensitive pilot valve is a needle valve spring loaded to be normally open.

3. A steam trap according to claim 2 further characterized in that said needle valve is connected to a temperature sensitive bellows housed within the chamber of said thermal head, said bellows being expandable by heat to close said normally open valve.

4. A steam trap according to claim 1 further characterized in that said piston is spring loaded to maintain the ports in the cylinder and piston walls normally closed.

5. A steam trap according to claim 1 further characterized in that, of each pair of matching ports in said cylinder and piston walls, one of said ports is generally circular and the other of said ports is generally triangular.

6. A steam trap according to claim 5 further characterized in that said triangular ports are in the form of equilateral triangles disposed with apices uppermost, the vertical distance from base to apex approximating the diameter of said matched circular ports.

7. A steam trap according to claim 6 further characterized in that said triangular ports are in said cylinder wall.

8. A steam trap according to claim 1 further characterized in that means are provided to prevent rotation of said piston in said cylinder.

9. A temperature regulated thermostatic steam trap comprising a cylinder body, a piston movable longitudinally in said cylinder body and a thermal head regulating movement of the piston; said body including an inlet and a discharge outlet, an annular chamber in the upper portion of the cylinder body in communication with said inlet and surrounding the bore of the cylinder body receiving said piston, and a plurality of ports from said chamber to the interior of the cylinder body, said ports being evenly spaced about the circumference of the inside cylinder wall and normally closed by said piston; said thermal head being disposed at the top of said cylinder body and including a chamber, an inlet port to said chamber in communication with said annular chamber in said cylinder body and an outlet port from said chamber to the cylinder headspace above said piston, a normally open spring loaded needle pilot valve controlling flow through said outlet port, said pilot valve being connected to a temperature sensitive bellows housed within the chamber of said thermal head, said bellows being expandable by heat to close said normally open pilot valve; said piston being generally tubular and closed at one end and open at the other, a bleeder orifice in the closed end of said piston, a plurality of ports in the wall of said piston, said ports being evenly spaced about the circumference of the piston matching in number and longitudinal alignment the ports in the cylinder wall, spring loading means for said piston to normally maintain the ports of said piston out of communication with said cylinder wall ports, said piston being movable longitudinally against said spring means to bring said ports into direct communication, and means to prevent rotation of said piston in said cylinder.

10. A steam trap according to claim 9 further characterized in that, of each pair of matching ports in said cylinder and piston walls, one of said ports is generally circular and the other of said ports is generally triangular.

11. A steam trap according to claim 10 further characterized in that said triangular ports are in the form of equilateral triangles disposed with apices uppermost, the vertical distance from base to apex approximating the diameter of said matched circular ports.

12. A steam trap according to claim 11 further characterized in that said triangular ports are in said cylinder wall.

References Cited in the file of this patent

UNITED STATES PATENTS

| | | |
|---|---|---|
| 841,389 | Goff | Jan. 15, 1907 |
| 2,029,203 | Soderberg | Jan. 28, 1936 |
| 2,193,581 | Clokey | Mar. 12, 1950 |
| 2,593,564 | Ives | Apr. 22, 1952 |
| 2,701,704 | Lawrence | Feb. 8, 1955 |
| 2,757,870 | Velan | Aug. 7, 1956 |

FOREIGN PATENTS

| | | |
|---|---|---|
| 734,832 | Great Britain | Feb. 13, 1952 |